United States Patent [19]

Mills et al.

[11] 3,714,058

[45] Jan. 30, 1973

[54] PROCESSING OF IRRADIATED NUCLEAR FUEL

[75] Inventors: Alfred Leonard Mills, Thurso, Caithness, Scotland; Kenneth Hartley, Seascale, Cumberland, England

[73] Assignee: United Kingdom Atomic Energy Authority, London, England

[22] Filed: Aug. 26, 1969

[21] Appl. No.: 853,193

[30] Foreign Application Priority Data

Sept. 18, 1968 Great Britain.....................44,452/68

[52] U.S. Cl. ..........................................252/301.1 R
[51] Int. Cl. ...............................................G09k 3/00
[58] Field of Search .....252/301.1; 23/344, 349, 354, 23/355

[56] References Cited

UNITED STATES PATENTS 3,082,163  3/1963  Ogard et al. ........................23/349 X
3,236,922  2/1966  Isaacs et al. ........................23/344 X

OTHER PUBLICATIONS

Lawroski et al. (I), Reactor Fuel Processing, Vol. 5, No. 3 pp. 37–39 (July 1962)
Lawroski et al. (II), Reactor Fuel Processing, Vol. 6, No. 3 pp. 34–36 (July 1963)
Moreau et al., Nuclear Science Abstracts, Vol. 21, no. 18 pp. 3,439 (Abs. No. 32,831) (Sept. 30, 1967)

Primary Examiner—Carl D. Quarforth
Assistant Examiner—R. L. Tate
Attorney—Larson, Taylor & Hinds

[57] ABSTRACT

Irradiated monocarbide nuclear fuel which may contain significant plutonium as well as uranium is converted to oxide by heating in carbon dioxide, preferably at a temperature of 1,000° C. Sesquicarbide may also be present. The product is dioxide soluble in nitric acid.

3 Claims, No Drawings

PROCESSING OF IRRADIATED NUCLEAR FUEL

BACKGROUND OF THE INVENTION

This invention relates to the processing of irradiated nuclear fuels. More specifically it is concerned with the processing of irradiated monocarbide fuel containing not only uranium but also significant plutonium, for example, single phase solid solution monocarbides such as uranium plutonium monocarbide, (U Pu)C.

The prime concern in the processing of such nuclear fuel is the separation of uranium and plutonium from fission products and from each other. For this purpose solvent extraction techniques are generally preferred and to this end dissolution of the fuel in nitric acid is required but a single stage direct dissolution process is not practicable with irradiated carbide. One of the main difficulties is that complex organic compounds are produced by the action of nitric acid on the fuel in question. These compounds give rise to difficulties in the subsequent solvent extraction process because they interfere with solvent/aqueous phase disengagement and complex the plutonium processing in the solution. They can also be a hazard in the raffinates by being a source of fume-off reactions or even explosions in fuel storage tanks if cooling were to fail.

SUMMARY OF THE INVENTION

According to the present invention irradiated monocarbide nuclear fuel is converted to oxide by heating in carbon dioxide.

The oxidation product is soluble in nitric acid (apart from the fission product sludge which is a feature of all high burn-up nuclear fuels). The nitric acid solution so formed can be treated by conventional solvent extraction methods for recovery of the uranium and plutonium. Processes for treating irradiated carbide nuclear fuel by oxidation by air involve oxidation through to the compound $U_3O_8 PuO_2$. The plutonium in this compound is not completely soluble in nitric acid and fluoride catalysis of the dissolution is required. Oxidation by carbon dioxide however does not lead to the formation of the compound $U_3O_8PuO_2$. Steam pyrolysis which has also been suggested as a method of treating irradiated carbide nuclear fuels gives rise to problems in equipment design because of the possibility of moderation and reflection and consequent need for criticality control.

DESCRIPTION OF THE PREFERRED EMBODIMENT

Oxidation is preferably carried out at a temperature of at least 1,000° C but not above 1,100° C. A satisfactory reaction does not occur at 950° C or below. In an example of a preferred method of carrying the invention into effect 60 gm of irradiated nuclear fuel element pins comprising uranium plutonium monocarbide clad in stainless steel were chopped into ½ inch lengths and heated at 1,000° C for about 3 hours under a stream of carbon dioxide at atmospheric pressure. The carbon dioxide flow rate was about 20 ml./min. The product was determined by X-ray as single phase solid solution $(UPu)O_2$ with no detectable carbide present. The product was soluble in 6 N nitric acid apart from fission product sludge.

The invention may be applied to the oxidation of mixed monocarbides and to single phase solid solutions. Further, up to 30 percent sesquicarbide may be present in the nuclear fuel with the monocarbide.

We claim:

1. A method of processing irradiated nuclear fuel comprising single phase uranium plutonium monocarbide, comprising the steps of heating said irradiated fuel in carbon dioxide at a temperature sufficient to oxidize the single phase uranium plutonium monocarbide to single phase solid solution $(UPu)O_2$, and dissolving the oxidized fuel in nitric acid, the oxidized plutonium and uranium being soluble in nitric acid.

2. A method of processing irradiated nuclear fuel as claimed in claim 1 wherein the fuel is heated in carbon dioxide at a temperature of 1,000° to 1,100° C.

3. A method of processing irradiated nuclear fuel as claimed in claim 1 wherein the fuel is heated in carbon dioxide at a temperature of 1,000° C.

* * * * *